United States Patent [19]

Benson

[11] Patent Number: 4,905,720

[45] Date of Patent: Mar. 6, 1990

[54] CURRENT-TO-PRESSURE TRANSDUCER WITH ENHANCED PERFORMANCE FEATURES

[75] Inventor: Richard A. Benson, Bedford, Mass.

[73] Assignee: Bellofram Corporation, Columbus, Ohio

[21] Appl. No.: 274,346

[22] Filed: Nov. 21, 1988

[51] Int. Cl.[4] .......... F16K 31/06

[52] U.S. Cl. .......... 137/1; 251/129.08; 251/129.2; 137/82

[58] Field of Search .......... 251/129.2; 137/82, 85

[56] References Cited

U.S. PATENT DOCUMENTS

| | | | |
|---|---|---|---|
| 2,964,051 | 12/1960 | Garnett | 137/85 |
| 3,155,104 | 11/1964 | Hilgert | 137/85 |
| 3,277,370 | 10/1966 | Clark | 324/154 |
| 3,390,694 | 7/1963 | Rouvalis | 137/85 |
| 3,768,772 | 10/1973 | Vischulis | 251/129 |
| 3,844,529 | 10/1974 | Brandt, Jr. | 251/61.1 |
| 3,982,554 | 9/1976 | Saito et al. | 137/82 |
| 4,170,339 | 10/1979 | Ueda et al. | 251/129.2 |
| 4,205,593 | 6/1980 | Sakakibara | 251/129.2 X |
| 4,336,819 | 6/1982 | Nishihara | 137/85 |
| 4,481,967 | 11/1984 | Frick | 137/85 |
| 4,554,938 | 11/1985 | Twisselmann | 137/82 |
| 4,579,137 | 4/1986 | Brandt, Jr. | 137/85 |
| 4,610,425 | 9/1986 | Kelly | 251/129.2 |
| 4,729,398 | 3/1988 | Benson et al. | 137/82 |

OTHER PUBLICATIONS

Fairchild Precision Electro-Pneumatic Transducer (I/P, E/P), Fairchild Industrial Products Co., product literature, 11/87.

*Primary Examiner*—Arnold Rosenthal

*Attorney, Agent, or Firm*—Fay, Sharpe, Beall, Fagan, Minnich & McKee

[57] ABSTRACT

An electric coil (20) induces a magnetic flux through a magnetic flow path (22, 24) which terminates in pole faces (26, 28) disposed parallel to a gap (30) therebetween. A non-ferrous pivot element (36) is mounted to one of the pole faces adjacent an edge thereof most distant from the gap. An armature (40) which is at least partially ferromagnetic is held in firm frictional engagement with the pivot element by a taut band (42). The armature pivots about the pivot element in accordance with current flowing through the coil. A fluid nozzle (54) is mounted adjacent the armature such that fluid flow through the nozzle is throttled in accordance with pivotal movement of the armature, hence, the electrical control signal current in the coil.

13 Claims, 2 Drawing Sheets

CURRENT-TO-PRESSURE TRANSDUCER WITH ENHANCED PERFORMANCE FEATURES

BACKGROUND OF THE INVENTION

The present invention relates to the art of pressure modulation. It finds particular application in conjunction with current-to-pressure transducers and will be explained with particular reference thereto. However, it is to be appreciated that the invention may also find application in other types of electro-pressure and magneto-pressure transducers.

Heretofore, current-to-pressure transducer have included a flapper valve or armature member mounted for pivotal movement on a taut metal band. See for example U.S. Pat. No. 4,729,398, issued Mar. 8, 1988. The taut band was displaced to one side of an electromagnet core and ferrous return path. Applying a current through the coil caused a magnetic flux to flow from the core, through the armature, and into the return path. The flux drew the armature towards the core with a force in accordance with the current applied to the coil.

In one mode of operation, a pneumatic nozzle was disposed to apply a pneumatic moment on the armature or flapper valve counteracting the magnetic moment. The nozzle was connected with conventional pneumatic circuitry which regulated output pressure in accordance with throttling of the nozzle by the armature. The equilibrium position of the armature was temporarily disrupted with each change in the coil current to change the amount of nozzle throttling and reestablish equilibrium with a different amount of throttling. A mechanical adjustment was provided for adjusting the torque that the taut band applied to bias the magnetic and pneumatic moments to a preferred equilibrium. In this mode, output pressure was regulated in direct relation to received input current.

In another mode of operation, the pneumatic nozzle was disposed to apply a pneumatic moment coincident with the magnetic moment. The taut band torque was adjusted for selectively opposing the sum of the magnetic and pneumatic moments. In this mode, output pressure was regulated in inverse relation to received input current.

Mechanical force responses of the armature to control currents of the above described tended to be related in accordance with a square-law characteristic. Linearization of the characteristic was promoted by compensatory shaping of pole faces, gap geometry, flapper valve shape and saturation point, and the like.

Although such design has proved successful, it has drawbacks when applied to high accuracy electronic-based output feedback devices which may consume 2mA for their operation leaving approximately 2mA in a 4 to 20mA device to allow for calibration adjustment and correction of environmentally induced errors.

One of the drawbacks of this design is that both the pneumatic and magnetic forces lie essentially in a common x-axis. Both are in the same direction, although the moments produced by these forces are in opposite directions. Although increased current forces ($F_i$) can be balanced by increased pressure forces ($F_p$), the function $\Delta f_p/\Delta f_i$ is not maximized due to mechanical losses. Specifically, a considerable amount of the x-axis force is lost because the taut band deflects in conformance with deflection theory. The taut band deflection in the x-axis is away from the nozzle such that it subtracts from the anticipated reward to be achieved by supplying an increased increment of current.

Another drawback of the prior art current-to-pressure transducer resides in its sensitivity to x-axis vibration. The mass of the armature when coupled with the low translational spring rate of the taut band caused a sensitivity to vibration in the x-axis at frequencies of interest beyond desirable limits.

In accordance with the present invention, a new and improved current-to-pressure transducer is provided which overcomes the above referenced drawbacks and others.

SUMMARY OF THE INVENTION

In accordance with the present invention, an electro-fluid pressure transducer is provided for continuously controlling fluid pressure in accordance with received electrical control signals. A rigid armature is mounted abutting a fixed pivot element for pivoting movement therearound. A torsion spring is connected with the rigid armature adjacent the fixed pivot element for supporting the armature and biasing it against the fixed pivot element. An electromagnet urges the armature to rotate about the fixed pivot element in accordance with the received electrical control signals. A nozzle is throttled by the armature and applies a fluidic pressure thereagainst. The armature pivots about the fixed pivot element until the magnetic, spring, and pneumatic moments are balanced.

In accordance with a more limited aspect of the present invention, the fixed pivot element is a nonmagnetic structure mounted to a core of the electromagnet. The pivot element is mounted adjacent an edge of the core opposite to a magnetic flux return path such that substantially all magnetic flux flows through a portion of the armature on one side of the pivot point.

In accordance with another more limited aspect of the present invention, the nozzle and magnetic return path are mounted closely adjacent the core and pivot element to minimize the length of the armature.

One advantage of the present invention is that it expands the range of calibration adjustment and other corrections when used in electronic-based output feedback transducers.

Another advantage of the present invention is that it further reduces x-axis sensitivity to vibration.

Still further advantages of the present invention will become apparent to those of ordinary skill in the art upon reading and understanding the following detailed description.

BRIEF DESCRIPTION OF THE DRAWINGS

The invention may take form in various parts and arrangements of parts. The drawings are only for purposes of illustrating a preferred embodiment and are not to be construed as limiting the invention.

DETAILED DESCRIPTION OF THE PREFERRED EMBODIMENT

Figure 1:
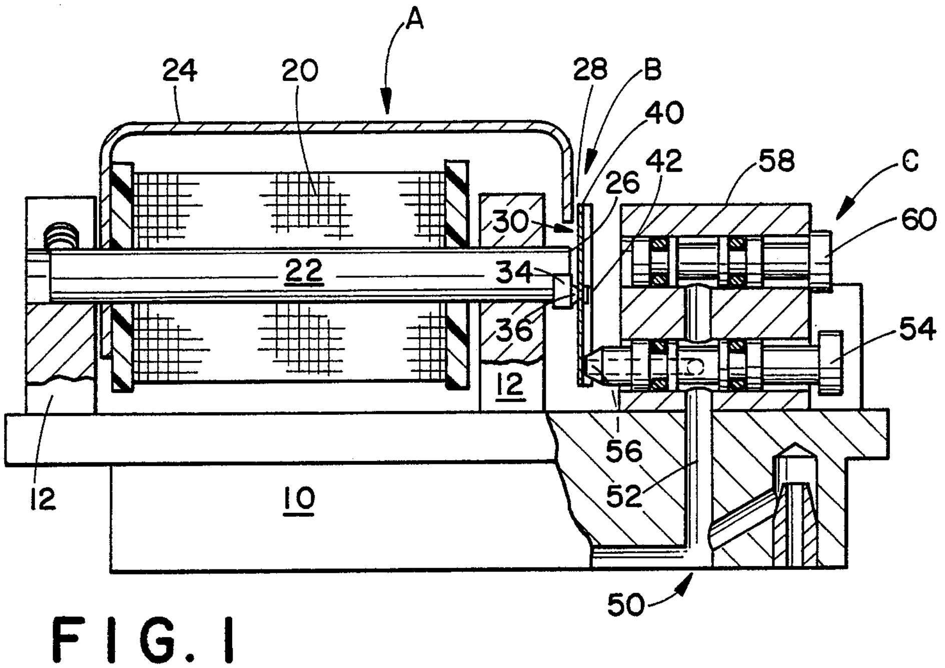
FIG. 1 is a side elevational view in partial cross section of an electro-fluidic transducer in accordance with the present invention.
Figure 2:
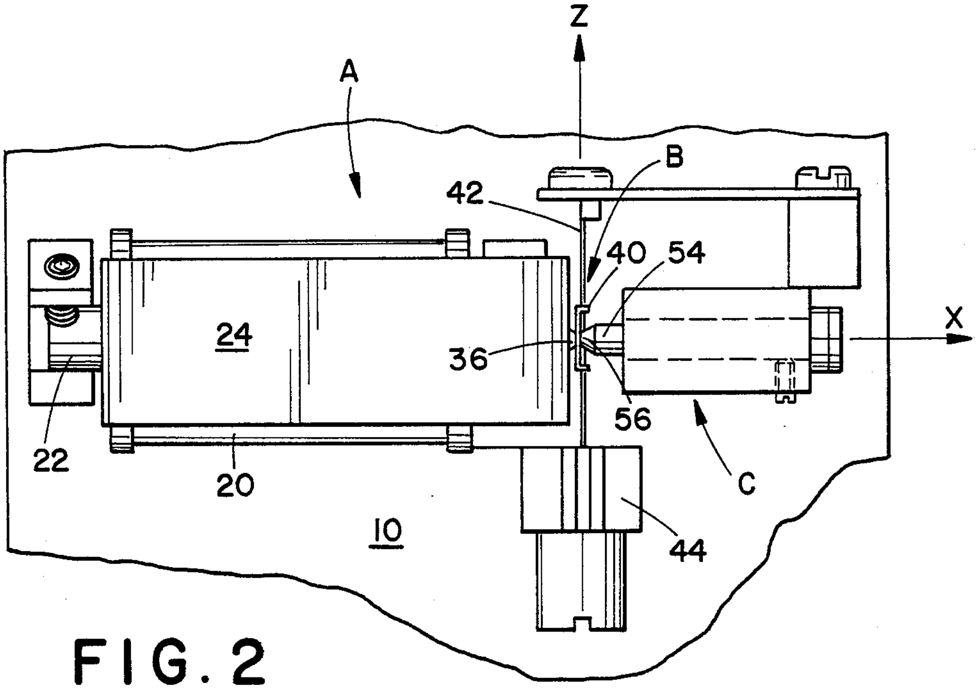
FIG. 2 is a top plane view of the transducer of FIG. 1.

With reference to FIGS. 1 and 2, an electromagnet means or assembly A urges an armature assembly B to rotate with a torque that varies in accordance with the current of an electrical control signal. Rotation of the armature causes a corresponding throttling of a nozzle assembly C.

A base 10 supports non-ferromagnetic posts or coil support members 12 for supporting the electromagnet assembly A. The electromagnet includes a coil 20 and generally U-shaped flux path including a ferromagnetic core 22 and return path 24. The core and return path define pole faces 26, 28 adjacent an air gap 30.

Figure 3:
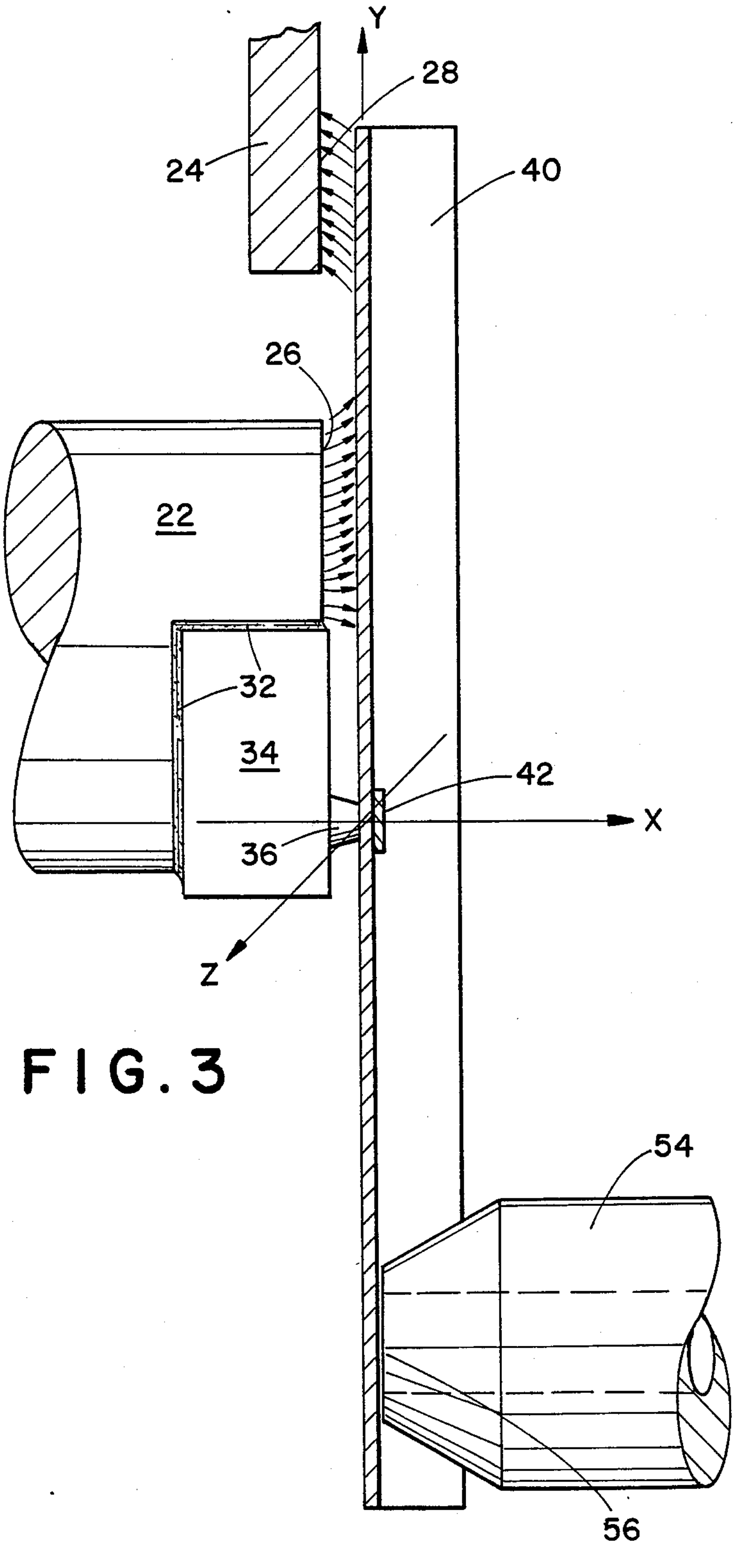
FIG. 3 is an enlarged illustration in partial section of the armature, nozzle, and core portions of the transducer of FIG. 1.

With particular reference to FIG. 3 and continuing reference to FIGS. 1 and 2, the core pole face 26 has a cut out region 32 in which a non-ferromagnetic insert or pivot mounting 34 is affixed. A non-ferromagnetic armature pivot element 36 is connected to the pivot mounting insert. In one embodiment, the insert and pivot element are integrally molded of high impact plastic. Optionally, the life of the pivot point may be increased by constructing the pivot element and insert of brass or other non-ferromagnetic metal material. As yet another alternative, the metal bearing surface or pivot point may be mounted on the outer most edge of the pivot element.

The armature assembly B includes a ferromagnetic armature element 40 which includes a planar surface that mounts parallel to the pole faces 26, 28 of the magnetic core and return path. The edges of the armature are folded to increase its rigidity. Other armature structures may also be utilized. However, it is preferred that the armature be sufficiently thin that the material magnetically saturates even under the lowest magnetic fields or input currents. The armature may be integrally constructed of the ferromagnetic material or maybe a combination of ferromagnetic and non-ferromagnetic portions.

The armature assembly is supported on a tension spring 42, such as a thin taut band of spring steel. The band is tautly mounted at opposite ends parallel with the contact face of the pivotal element to bias the armature against the pivot element. The pivot element 36 is displaced off center adjacent an edge of the core face furthest from the return path. This position of the pivot element concentrates the magnetic flux in the armature to the region between the core and the return path closely adjacent the gap. An angularly adjustable fitting 44 is provided at one end for selectively twisting the taut band about its longitudinal axis. In this manner, the taut band acts as an adjustable torsion spring which biases the armature to achieve a desired output pressure.

The nozzle assembly C is mounted on the base 10 in fluid communication with a fluid circuit 50 such as a pneumatic amplifier. A port or passage 52 provides fluid communication between the fluid circuit and a nozzle 54. The nozzle has an outlet orifice 56 disposed closely adjacent the armature element.

A pneumatic amplifier type fluidic circuit separately controls a main valving of a pneumatic input in order to realize a desired pressure on its output side. As the pressure on the output side increases, the force of the air ejected from the nozzle 54 tends to increase analogously. In this manner, as the input current to the coil 20 increases, the armature tends to rotate toward the nozzle increasing the throttling. The throttling adjusts the pneumatic circuit until the feedback pressure increases sufficiently to reestablish equilibrium. Analogously, as input current is decreased, the armature element moves away from the nozzle, decreasing the throttling causing the output pressure to drop. As the output and the nozzle feedback pressure drop, the armature element returns to equilibrium. Adjusting the torque of the taut band, adjusts the equilibrium position by adding a moment in favor or opposition to the nozzle and/or ferromagnetic moments.

Optionally, the nozzle or a second interconnectable nozzle may be disposed on the opposite side of the taut band such that its feedback force complements the magnetic attractive forces. With this arrangement, the throttling is inversely proportional rather than proportional to the input current. To facilitate interchanging between the proportional and inversely proportional modes, a valve housing 58 may have two valve receiving bores. One bore element carries the nozzle and the other holds a plug 60. By interchanging the plug and the nozzle, the position at which the fedback pneumatic pressure impacts the armature is selectable.

The invention has been described with reference to the preferred embodiment. Obviously, modifications and alterations will occur to others upon reading and understanding the preceding detailed description. It is intended that this invention be construed as including all such alterations and modifications insofar as they come within the scope of the appended claims or the equivalents thereof.

Having thus described the preferred embodiment, the invention is now claimed to be:

1. An electro-fluidic pressure transducer for controlling fluid pressure in accordance with received electrical control signals, the transducer comprising:

a fixed pivot element;

a rigid armature mounted abutting the fixed pivot element for rotational movement thereabout;

a taut element connected with the armature opposite to the pivot element such that the armature is (i) pivotal about a central axis of the taut element and (ii) is biased by the taut element into firm engagement with the pivot element;

an electromagnetic means for urging the armature to rotate about the pivot element with an amount of force that varies generally in accordance with the received electrical control signals; and, a nozzle for feeding back fluid pressure from a fluidic circuit, the nozzle being mounted closely adjacent the armature such that the armature throttles air flow from the nozzle in accordance with a rotational position of the armature about the pivot element.

2. An electro-fluidic pressure transducer for controlling fluid pressure in accordance with received electrical control signals, the transducer comprising:

a fixed non-ferromagnetic pivot structure;

a rigid armature mounted abutting the fixed pivot structure for rotational movement thereabout;

an armature supporting means for supporting the armature and urging it into firm engagement with the pivot structure;

an electromagnetic means for urging the armature to rotate about the pivot element with an amount of force that varies generally in accordance with the received electrical control signals, the electromagnetic means including a ferromagnetic core having an end face, the pivot structure being mounted to the end face of the ferromagnetic core of the electromagnetic means; and, a nozzle for feeding back fluid pressure from a fluidic circuit, the nozzle being mounted closely adjacent the armature such that the armature throttles air flow form the nozzle in accordance with a rotational position of the armature about the pivot structure.

3. The transducer as set forth in claim 2 wherein the core has as reduced cross section adjacent the pivot to concentrate magnetic flux flowing therefrom through the armature.

4. The transducer as set forth in claim 3 wherein the electromagnet means includes a magnetic flux return path, the return path and core defining an air gap therebetween generally along the armature such that magnetic flux flows from the core, through the armature, and through the return path, the fixed pivot being mounted to the core opposite the gap and return path.

5. The transducer as set forth in claim 1 wherein the electromagnet means includes a generally U-shaped ferromagnetic flux path which defines an air gap therebetween, the armature being disposed immediately contiguous to the air gap such that ferromagnetic flux traverses the air gap by flowing through a portion of the armature immediately thereadjacent; and, wherein the fixed pivot element is mounted to the ferromagnetic flux path opposite the gap such that magnetic flux in the armature is concentrated in a portion of the armature to one side of the pivot element.

6. An electro-fluidic pressure transducer for controlling fluid pressure in accordance with received electrical control signals, the transducer comprising:

a fixed pivot element;

a rigid armature mounted abutting the fixed pivot element for rotational movement thereabout;

an armature supporting means for supporting the armature and urging it into firm engagement with the pivot element;

an electromagnetic means for urging the armature to rotate about the pivot element with an amount of force that varies generally in accordance with the received electrical control signals, the electromagnet means including a generally U-shaped ferromagnetic flux path which defines an air gap therebetween, the armature being disposed immediately contiguous to the air gap such that ferromagnetic flux traverses the air gap by flowing through a portion of the armature immediately thereadjacent, the fixed pivot element being mounted to the ferromagnetic flux path opposite the gap, the ferromagnetic flux path having a reduced cross section adjacent the pivot element to concentrate the magnetic flux; and, a nozzle for feeding back fluid pressure from a fluidic circuit, the nozzle being mounted closely adjacent the armature such that the armature throttles air flow form the nozzle in accordance with a rotational position of the armature about the pivot element.

7. An electro-fluidic pressure transducer for controlling fluid pressure in accordance with received electrical control signals, the transducer comprising:

a fixed pivot element;

a rigid armature mounted abutting the fixed pivot element for rotational movement thereabout;

a relatively wide taut band connected to the armature closely adjacent the fixed pivot supporting the armature and urging it into firm engagement with the pivot element;

an adjusting means for selectively adjusting a torsion moment applied to the armature by the taut band;

an electromagnetic means for urging the armature to rotate about the pivot element with an amount of force that varies generally in accordance with the received electrical control signals; and, a nozzle for feeding back fluid pressure from a fluidic circuit, the nozzle being mounted closely adjacent the armature such that the armature throttles air flow from the nozzle in accordance with a rotational position of the armature about the pivot element.

8. The transducer as set forth in claim 1 wherein the electromagnet means includes a ferromagnetic conductive generally U-shaped flux path that has a pair of contiguous ends defining a gap therebetween, the ends having pole faces disposed contiguous and parallel to the armature such that magnetic flux traverses the gap by flowing through and magnetically saturating the armature, the taut element and the fixed pivot element being disposed adjacent one of the pole faces contiguous to an edge thereof opposite to the gap such that the magnetic flux flows primarily through a portion of the armature to one side of the taut element.

9. The transducer as set forth in claim 8 wherein the pole face contiguous to the taut element has a reduced cross section to concentrate the magnetic flux into the armature away from the taut element.

10. A current-to-pressure transducer for controlling pneumatic flow in accordance with received electrical control signals, the transducer comprising:

a generally U-shaped ferromagnetic path defining a gap between opposite ends thereof, each end defining a pole face generally parallel to the gap;

a non-ferromagnetic pivot element mounted to one of the pole faces;

an armature mounted contiguous to both pole faces and for pivotal movement about the pivot element, the armature being magnetically conductive at least in a region extending between the two pole faces;

a coil for inducing magnetic flux through the ferromagnetic path, the coil having connections for receiving the control signals; and, a nozzle mounted contiguous to the armature such that pneumatic flow through the nozzle is selectively throttled as the armature pivots about the fixed pivot element.

11. The transducer as set forth in claim 10 wherein the pole face in which the pivot element is mounted has a cut out region towards an edge opposite the gap, the pivot element being mounted in the cut out region.

12. The transducer as set forth in claim 10 including a torsion spring connected to the armature contiguous to the pivot element for (i) supporting the armature and (ii) biasing the armature into firm, frictional engagement with the pivot element.

13. A method of regulating pressure comprising:

fixing a rigid armature at least a portion of which is ferromagnetic between a non-ferrous pivot element and a torsion spring such that the armature is free to rotate about the pivot element;

inducing a magnetic flux through the ferromagnetic conductive portion of the armature to one side of the pivot element to apply a magnetic force which urges the armature to rotate about the pivot element;

causing fluid flow through a fluid nozzle disposed closely adjacent the armature such that the fluid flow is selectively throttled by the armature in accordance with the magnetic field.

* * * * *